United States Patent
Georgson et al.

(10) Patent No.: US 7,310,059 B2
(45) Date of Patent: Dec. 18, 2007

(54) TRANSPARENT PANE WITH RADAR-REFLECTING PROPERTIES

(75) Inventors: Mikael Georgson, Örnsköldsvik (SE); Örjan Staaf, Uppsala (SE)

(73) Assignee: Totalforsvarets Forskningsinstitut, Stockholm (SE)

( * ) Notice: Subject to any disclaimer, the term of this patent is extended or adjusted under 35 U.S.C. 154(b) by 190 days.

(21) Appl. No.: 10/524,439

(22) PCT Filed: Aug. 15, 2003

(86) PCT No.: PCT/SE03/01282

§ 371 (c)(1),
(2), (4) Date: Feb. 15, 2005

(87) PCT Pub. No.: WO2004/016562

PCT Pub. Date: Feb. 26, 2004

(65) Prior Publication Data

US 2006/0164719 A1    Jul. 27, 2006

(30) Foreign Application Priority Data

Aug. 15, 2002   (SE) .................................... 0202432

(51) Int. Cl.
*H01Q 17/00*   (2006.01)
(52) U.S. Cl. .................. 342/3; 342/1; 342/2; 342/4
(58) Field of Classification Search .............. 342/1–4; 428/426–701; 359/359, 580, 585
See application file for complete search history.

(56) References Cited

U.S. PATENT DOCUMENTS

| | | | | |
|---|---|---|---|---|
| 3,235,397 A * | 2/1966 | Millendorfer | ................ | 359/588 |
| 3,568,195 A * | 3/1971 | Wesch et al. | ................... | 342/1 |
| 3,604,784 A * | 9/1971 | Louderback et al. | ......... | 359/586 |
| 3,680,107 A * | 7/1972 | Meinke et al. | ................. | 342/1 |
| 3,712,711 A * | 1/1973 | Adachi | ........................ | 359/586 |
| 3,737,903 A * | 6/1973 | Suetake et al. | ................ | 342/1 |
| 3,761,160 A * | 9/1973 | Apfel et al. | ................. | 359/588 |
| 3,781,090 A * | 12/1973 | Sumita | ........................ | 359/588 |
| 3,938,152 A * | 2/1976 | Grimes et al. | ................. | 342/1 |
| 4,128,303 A * | 12/1978 | Onoki et al. | ................. | 359/588 |
| 4,965,121 A * | 10/1990 | Young et al. | ................ | 428/213 |

(Continued)

*Primary Examiner*—Thomas H. Tarcza
*Assistant Examiner*—Hien Ly
(74) *Attorney, Agent, or Firm*—Jacobson Holman PLLC

(57) ABSTRACT

The panes (1) of a naval vessel or military vehicle are often coated with a radar-reflecting layer (20) for reduction of the radar signature of the vessel/vehicle. At the same time this layer increases an enemy's possibility of recognizing the vessel in passive IR reconnaissance since the layer increases the reflectance also for IR radiation to a considerable extent. As a result, the intensity of IR radiation that an enemy receives from the panes is much lower than that from the rest of the vessel, which with signal processing can be used to increase the possibility of recognizing the vessel. According to the invention, it is suggested that the panes (1) on the outer face (8) also have a second layer (21, 22) to increase emittance especially within the IR range 2-20 μm which is normally used for reconnaissance and the like. This second layer (21, 22) comprises especially two coatings, one of which is active in the IR range 3-5 μm and the second in the IR range 7-14 μm. The first coating (21) is suggested to comprise tin dioxide and the second coating (22) oxidized silicon nitride.

20 Claims, 2 Drawing Sheets

U.S. PATENT DOCUMENTS

| | | | |
|---|---|---|---|
| 5,091,244 A * | 2/1992 | Biornard ..................... 428/216 |
| 5,275,880 A * | 1/1994 | Boyer et al. ................. 428/328 |
| 5,323,160 A * | 6/1994 | Kim et al. ..................... 342/1 |
| 5,336,965 A * | 8/1994 | Meyer et al. ................ 313/498 |
| 5,362,552 A * | 11/1994 | Austin ......................... 428/216 |
| 5,377,045 A * | 12/1994 | Wolfe et al. ................ 359/585 |
| 5,450,238 A * | 9/1995 | Bjornard et al. ............ 359/580 |
| 5,891,556 A * | 4/1999 | Anderson et al. ........... 428/216 |
| 5,922,986 A * | 7/1999 | Wanninger et al. ........ 89/36.17 |
| 6,068,914 A * | 5/2000 | Boire et al. .................. 428/216 |
| 6,111,534 A * | 8/2000 | Escarmant ..................... 342/1 |
| 6,174,599 B1 * | 1/2001 | Boire et al. .................. 428/336 |
| 6,326,079 B1 * | 12/2001 | Philippe et al. .............. 428/325 |
| 6,490,091 B1 * | 12/2002 | Woodruff et al. ............ 359/585 |
| 6,495,263 B2 * | 12/2002 | Stachowiak .................. 428/428 |
| 6,524,714 B1 * | 2/2003 | Neuman et al. ............. 428/428 |
| 6,589,658 B1 * | 7/2003 | Stachowiak ................. 428/432 |
| 6,602,608 B2 * | 8/2003 | Stachowiak .................. 428/432 |
| 6,623,846 B2 * | 9/2003 | Laird ........................... 428/216 |
| 6,846,556 B2 * | 1/2005 | Boire et al. .................. 428/325 |
| 6,906,863 B2 * | 6/2005 | Yoshida et al. .............. 359/584 |
| 2003/0052810 A1 * | 3/2003 | Artis et al. ..................... 342/1 |

* cited by examiner

TRANSPARENT PANE WITH RADAR-REFLECTING PROPERTIES

This is a nationalization of PCT/SE03/001282 filed Aug. 15, 2003 and published in English.

FIELD OF THE INVENTION

The invention relates to a pane according to the preamble to claim 1. The pane is intended for use mainly as a visual pane in a military vehicle or vessel, for instance a combat vehicle or a marine vessel. To reduce, for instance, back reflection to a radar transmitter, the pane which is preferably made of glass is arranged with an outer face reflecting radar beams. To this end, the pane is usually coated with a layer of metal or metal oxide.

BACKGROUND ART

Vehicles or vessels of different kinds are provided with panes to make it possible for the crew to look out from the interior of the vehicle, to cover sights, searchlights etc. The panes, which are transparent to the useful radiation used for the purpose, which can be IR or UV radiation but preferably light visible to the eye, are usually made of glass. When IR radiation is used, they are made of e.g. germanium. If the panes are used in combat vehicles, they should provide good defensive capability. Therefore they have a considerable thickness, in many cases more than 50 mm, and are made of laminated glass, for instance a number of sheets of toughened glass with intermediate layers of some polymer.

Modern combat vehicles should have stealth properties which are obtained, for instance, by a suitable design with flat hard surfaces. The surfaces are arranged to reflect as much as possible of the enemy radiation away from the enemy transmitter/receiver. This first enemy radiation usually comprises radar beams which are used for reconnaissance and by homing devices, but can also be some other electromagnetic radiation such as UV or laser radiation. If the vehicles have uncoated glass panes letting through radar beams, these will penetrate into the interior of the vehicle. There they will be reflected once or several times before they return to the transmitter more or less randomly. If the beams are also reflected by corner reflectors, which are often present in the interior, a considerable part of the beams is reflected back, resulting in deteriorated stealth properties.

This inconvenience is prevented by the glass panes according to prior art being arranged to reflect the radar beams so that they will be directed away from the transmitter in the same way as described above for the other parts of the vehicle. The reflection is achieved by the pane comprising, for instance, a layer which reflects radar beams and which, like the pane itself, is transparent to the useful radiation used for the purpose.

If this layer is inserted in the pane a distance down from its outer face, corner reflectors are obtained in the corners of the pane between two of the adjoining edge surfaces of the pane and the reflective layer. With this layer arranged deep down in a thick pane, the back reflection from these corner reflectors will be considerable.

Corner reflectors will, of course, not be formed if the reflective layer according to prior art is arranged on the outer face of the pane or if the pane is arranged to be reflective in some other way. The reflection may act by interference or holography but is preferably arranged by means of an electrically conductive layer of e.g. metal or metal oxide. The layer has such a thickness that visibility is not prevented but still has so low resistance that effective reflection for radar beams is obtained. Examples of materials used are gold, indium oxide and tin oxide. The latter coatings are usually preferred since they do not, like gold, cause colouring of the transmitted light.

An outer face which is highly reflective for radar has the drawback that it can get very high reflectance also for a second radiation used by the enemy. This is usually also electromagnetic radiation, which like the first enemy radiation is often used for reconnaissance and homing purposes. Specifically, the second radiation is IR radiation which as a rule is used passively and for which the pane surface, with a metal or metal oxide coating, will have very high reflectance. Since the glass material that is usually to be found in a pane does not let IR radiation through from the interior of the vehicle, the radiation from the pane, which can be perceived by an IR instrument, depends on the natural radiation of the pane as well as reflected radiation. The natural radiation depends on temperature and emittance of the body surface. In general, emittance is very low when reflectance is very high like in this case.

The other parts of the vehicle have much higher emittance than the radar-reflecting pane, usually 0.8-0.9 instead of 0.2 or less for the pane. The temperature of the other parts is usually approximately the same as that of the pane, since both of them are largely determined by the temperature of their common inner spaces. These other parts will therefore emit a radiation intensity which thus is 4-5 times greater than that of the pane since the characteristic temperatures are the same and the intensity is determined by the emittances of the surfaces.

As mentioned above, the coated pane's reflectance for IR radiation is very high. The radiation of the pane therefore consists mainly of reflection of the IR radiation from the surroundings. On stealth vehicles, the sides are frequently inclined inwards upwards, which means that the panes will reflect IR radiation from the sky. Especially in cloudless nights, a very small amount of radiation comes from the sky. This small amount of radiation thus adds very little to the small amount of emitted radiation.

The total radiation from the panes of the vehicle will thus be much smaller than the radiation from the other parts of the vehicle. By signal processing, this difference can be used to produce images, show symbols for different kinds of targets, program weapons or ammunition etc. In, for instance, image production, the panes will have a change in colour, usually dark fields, on an image of the vehicle which is otherwise light. The size and location of these differently coloured fields in the image of the vehicle facilitate recognition of the vehicle. Since recognition is the basis for an enemy's choice of a successful mode of combating, involving inter alia the choice of suitable tactics and weapons, the existence of these differently coloured fields will be highly detrimental to the vehicle in a combat situation. The mode of combating is different if the target is a heavily armoured tank or a lightly armoured tracked vehicle.

DESCRIPTION OF THE INVENTION

Technical Problem

The object of the invention is to provide a pane of the type defined by way of introduction for use especially in military vehicles or vessels, such as combat vehicles and military vessels. With the pane according to the invention, the effects, which are detrimental to recognition, will be suppressed owing to the lower emittance of the pane to such an extent that they cannot facilitate such recognition, without the reflexivity of the pane for e.g. radar beams being reduced to such an extent as to significantly increase the risk of the vehicle being discovered.

Solution

The object is achieved by the pane being given the features that are evident from any of the appended claims.

According to the invention, it is suggested that the pane should comprise a layer, which is adapted to increase the emittance of the pane for the second enemy radiation, usually IR light, which is used where appropriate. The layer should preferably increase emittance to correspond approximately to that of the parts of the vehicle which adjoins the pane. Since the pane, as mentioned above, has approximately the same temperature as said surrounding parts, the heat radiation will be the same as for these parts. This affects the enemy's possibility of recognition by observing said fields with lower emittance, using signal processing.

IR instruments of the type mentioned above are usually arranged to recognise IR radiation within the wavebands which can penetrate atmosphere mixed with combat smoke and moisture. Therefore their sensitivity is adjusted to the range of about 2-20 μm, specifically the two so-called IR windows 3-5 μm and 7-14 μm. For an increase of emittance, the layer must therefore be active especially for the ranges of these windows.

The layer should, like the material for the reflection of the first enemy radiation, for instance radar beams, be transparent to the useful radiation used for the purpose, usually light visible to the eye. If the layer is arranged on the outer face of the pane, it should be scratch-resistant in order to resist wear caused by e.g. windscreen wipers. In the preferred embodiment, the layer is made of a predetermined kind of a material with a certain thickness, which results in a desirable emittance.

The layer can be made of glass or a polymer. However, such a layer may have great drawbacks such as having too low emittance and being brittle and sensitive to scratching. According to one embodiment of the invention, it is therefore suggested to use a layer comprising materials that are more suitable. These materials are often active only in a limited waveband. By using in the layer at least one, preferably two such materials which for practical reasons are preferably included in a coating each and are adapted to be active in an important range each, for instance in the above-mentioned IR windows 3-5 μm and 7-14 μm, a visual pane with the desired properties can be obtained.

One example is a layer arranged on the outer face of the pane and comprising one, or preferably both, of the following coatings: a first coating comprising a metal oxide, preferably a material of the kind of metal oxides which have low electrical conductivity and which especially are near stoichiometric. Such materials are often active especially in the IR window 3-5 μm. They are active by having free charge carriers which cause the materials when irradiated to absorb radiation especially within said window with short wave IR radiation. According to the laws of physics, greater absorption implies that the material surface has higher emittance. Examples of suitable metal oxides which may be near stoichiometric are titanium oxide, zirconium oxide, hafnium oxide, magnesium oxide and tin oxide, the dioxides of which are often the most useful ones. Also other materials, which are near stoichiometric, than metal oxides are conceivable for the purpose.

A second coating which may comprise a preferably hard material and may be a ceramic.

It has been found that materials that are suitable to produce IR light in a certain waveband by means of so-called residual beams are suitable also for this purpose. If some of these materials, which thus are of the kind that has residual beam band properties, are irradiated with IR light, oscillations of the lattice atoms of the material arise especially for the light that has a somewhat longer wavelength, such as the light in the window 7-14 μm. Energy is absorbed and the material surface obtains higher emittance also in this case. Examples of suitable materials with residual beam band properties are silicon oxide, e.g. quartz, beryllium oxide and beryllium silicate, silicon carbide, sialon, cubic boron nitride and silicon nitride. Also other materials having residual beam band properties than those mentioned above are conceivable for the purpose.

From the optical point of view, these coatings can be arranged in arbitrary sequence on the pane, but in most cases, it is easiest to produce the layer and/or the layer will have optimal mechanical properties when the coatings are arranged in a predetermined sequence, which has to be established by tests.

Advantages

According to the preferred embodiment, use is made of coatings of undoped tin oxide and oxidised silicon nitride, which are each active in a separate IR window. The emittance in these windows has been increased to about 0.8, i.e. to a value which approximately corresponds to the value of those parts of the vehicle that surround the pane. On the IR instrument of the enemy, the material implies that differently coloured fields for the panes of the vehicle are no longer shown. This makes the identification of the target difficult. The added coatings do not reduce the pane reflection for radar beams in a detrimental manner. The preferred material prevents transparency only minimally and has been found to be highly scratch-resistant.

DESCRIPTION OF THE FIGURES

A preferred embodiment will be described in more detail with reference to the accompanying Figures, the reference numerals of which designate equivalent parts in the Figures.

PREFERRED EMBODIMENT

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
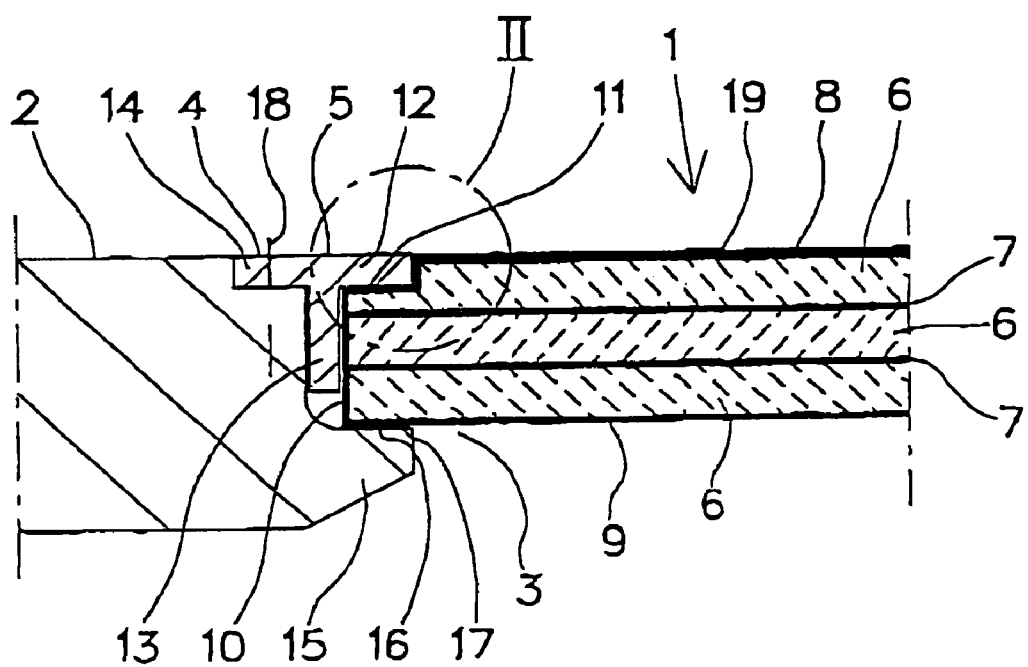
FIG. 1 is a cross-sectional view of part of a framed visual pane for a naval vessel.

FIG. 1 shows a visual pane 1 according to the invention for a naval vessel. The visual pane is inserted in a wall 2 of a superstructure belonging to the hull of the vessel to be one of the visual panes of the navigation bridge. The visual pane is kept in place in an opening 3, which is formed in the wall 2 and which of course is a through opening, by means of a mounting frame 4 of metal. The mounting frame is made up of T-shaped sections welded together at the corners so as to obtain a flat exterior surface 5.

The visual pane consists of a laminate comprising according to prior-art technique a number of sheets 6 of toughened glass and intermediate layers 7 of polymer, preferably polyvinyl butyral. With a total thickness of about 50 mm, the pane provides, strengthened by the reinforcing properties of the polymer layers, a defensive capability which can prevent splinters from penetrating into the vessel. The visual pane has an outer face 8 and an inner face 9 which are flat and parallel and also edge faces 10 extending perpendicular to the outer face. Along the periphery, the outer face of the visual pane has a recess 111 of such a design that an inner flange 12 of the mounted mounting frame is inserted in the visual pane to such an extent that the flat exterior surface 5 of the mounting frame is on a level with the outer face 8 of the mounted visual pane. A rim flange 13 of the mounting frame, which is arranged at an angle to the inner flange 12, is designed in its mounted state to encompass the visual pane with a suitable play to the edge face 10 of the visual pane.

The opening 3 arranged in the hull for the visual pane can in its outer part accommodate the mounting frame 4. Along the opening, the wall is recessed to allow an outer flange 14 of the mounting frame to be inserted so that the exterior surface 5 of the mounting frame is on a level with the outer surface of the hull wall 2 outside this recessed portion. The outer surfaces of the hull, the mounting frame and the visual pane will thus be located in a common plane, which is favourable to the stealth properties of the vessel. Any undesirable intermediate gaps are filled with electrically conductive or radar-absorbing material.

Inside the recess for the outer flange, the opening has dimensions so that it can accommodate the rim flange 13 of the mounting frame with a suitable play. A distance below this zone, the opening is made more narrow so as to form, along the entire edge, a bracket 15 formed of the hull wall and having a flat abutment surface 16 parallel with the outer surface of the wall. The visual pane is kept in place by being clamped between this abutment surface and said mounting frame 4. A sealing and pressure-equalising packing 17 is inserted between the visual pane and the abutment surface. The mounting frame is fastened to the hull wall by means of faintly outlined screws 18.

Figure 2:
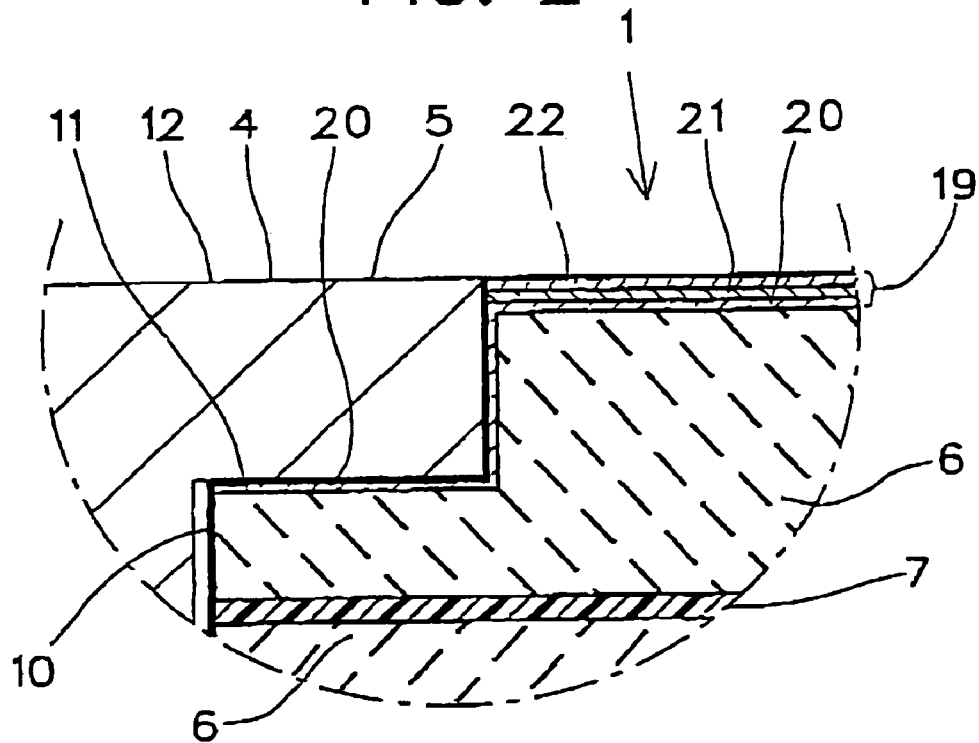
FIG. 2 is an enlarged view of the area II in FIG. 1 of the visual pane with the coatings according to the invention.

The visual pane has at its outer face a layer 19 the composition of which is shown in detail in FIG. 2. For the sake of clarity, the layer is shown disproportionately thick in the two Figures. The layer consists of three coatings, the innermost one of which is a radar-reflecting coating 20 according to prior art having the properties described by way of introduction. The coating essentially comprises doped tin dioxide with a thickness of about 0.5-1 µm. For optimal effect, the coating is earthed to the vessel wall 2 by extending also over the recessed part 11 of the visual pane. There it abuts against the mounting frame in electrical contact therewith by the arrangement of a sealing and electrically conductive putty.

On the outside of the radar-reflecting coating 20 there are two coatings 21, 22 according to the invention for increasing the emittance of the visual pane. The coatings extend over the entire visual pane except the recessed part 11. A first coating 21 of undoped tin oxide ($SnO_2$) with a thickness of 0.3-0.8 µm, preferably about 0.5 µm, which is applied directly to the radar-reflecting coating, increases the emittance for light especially in the range of the IR window 3-5 µm. Farthest out, on the outside of this first coating, there is a second coating 22 which increases the emittance for light especially in the range of the IR window 7-14 µm. This coating is made of oxidised silicon nitride ($SiO_xN_y$) and has a thickness of 0.5-1.5 µm, preferably about 1.0 µm.

The radar-reflecting coating and the first emittance-increasing coating are applied by a physical vapour deposition method, such as sputtering. Here use is made of an inert gas such as argon with oxygen added, under a very low pressure in a space between the visual pane and a cathode comprising tin doped with 10% antimony for the radar-reflecting coating and undoped tin for said first coating. When electric voltage is applied over the visual pane and the cathode, the argon is ionised and material migrates from the cathode to the visual pane while the tin reacts with the oxygen, thereby forming tin oxide. In testing, a flow volume ratio of argon to oxygen of about 5:3 has ensured good results.

These two coatings can also be applied by a chemical vapour deposition method, such as pyrolysis. For the radar-reflecting coating, a tin chloride alcohol solution is spayed together with a solution containing fluorine or antimony, for instance an aqueous solution containing ammonium fluoride, onto a visual pane heated to 450° C., where the tin chloride reacts with oxygen of air and forms doped tin oxide. In spraying, a flow volume ratio of the tin chloride solution to the ammonium fluoride solution of about 2:3 is used. For the first coating, only a tin chloride alcohol solution is sprayed onto the visual pane heated to 380° C. Great variations from these values can be allowed without detriment to the result. The reason why the reflective tin oxide coating is doped is that free charge carriers will be formed in the material. As a result, the coating obtains so high electrical conductivity that sufficient radar-reflecting power is achieved.

Regarding the first coating, use is, as mentioned above, made of the tin oxide undoped and preferably with a shortage of oxygen so that the near stoichiometric tin oxide with low electrical conductivity is to be obtained. As described above, this material absorbs radiation in the IR range 3-5 µm.

The second coating, which is made of oxidised silicon nitride, is applied by sputtering. Nitrogen and oxygen are used as sputtering gases at a flow volume ratio of about 17:1 for forming the oxidised silicon nitride. Silicon is used as material of the cathode. Said flow volume ratios are only standard values and are dependent on the used apparatus. Great variations from these values, however, may be allowed without detriment to the result.

In order to make discovery still more difficult, the visual pane can be provided with an antireflex coating which reduces the surface reflections of the pane. Especially at oblique viewing angles which may arise when the visual pane is integrated into signature-adjusted vessels, the surface reflections can be great and thus expose the vessel. Moreover, the antireflex coating allows increased visual transmission through the visual pane, which increases the contrast in the surroundings viewed by the eye or the sensor.

An example of antireflex coating is to apply an antireflex coating of magnesium fluoride on both sides of the visual pane, i.e. on the inner face 9 as well as on the layer 19 of the outer face. The thickness of the antireflex coatings can be optimised for different viewing angles, for instance an optimal thickness for the viewing angle 60 degrees is 0.12 µm. This antireflex coating reduces reflectance from 25% to 10%.

Another example of antireflex coating is applying an antireflex coating consisting of a four-layer coating on the outer face 8 of the pane. The four-layer coating comprises alternately layers of titanium dioxide ($TiO_2$) and magnesium fluoride (MgF). An antireflex coating optimised for 60 degrees has the thickness 0.088 μm TiO$_2$; 0.238 μm MgF; 0,083 μm TiO$_2$ and 0.114 μm MgF seen from the layer 19 outwards.

Figure 3:
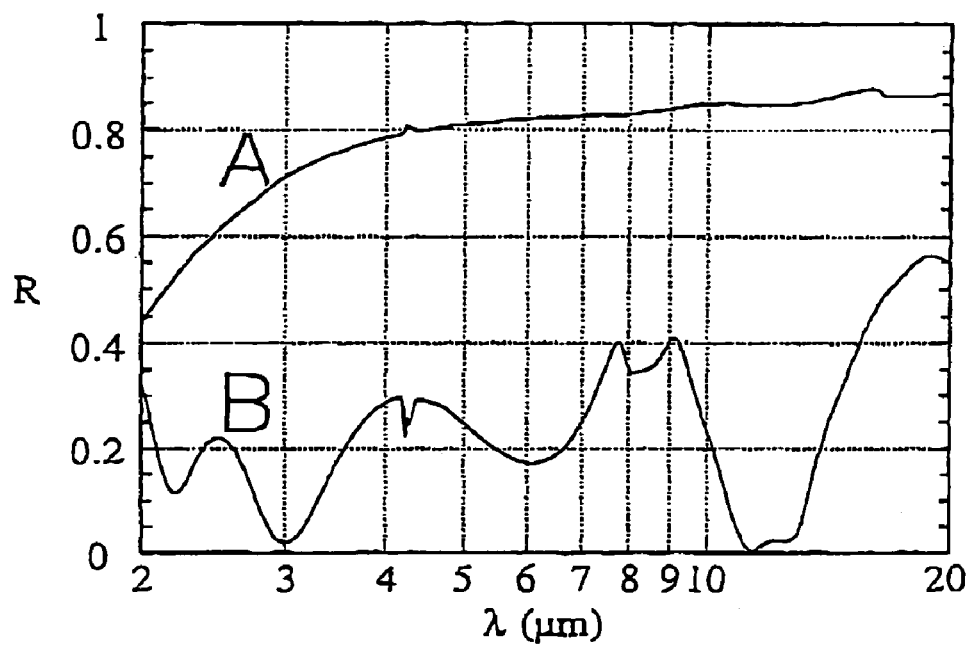
FIGS. 3 and 4 show diagrams of the spectral properties of the surfaces that are useful in the context.
Figure 4:
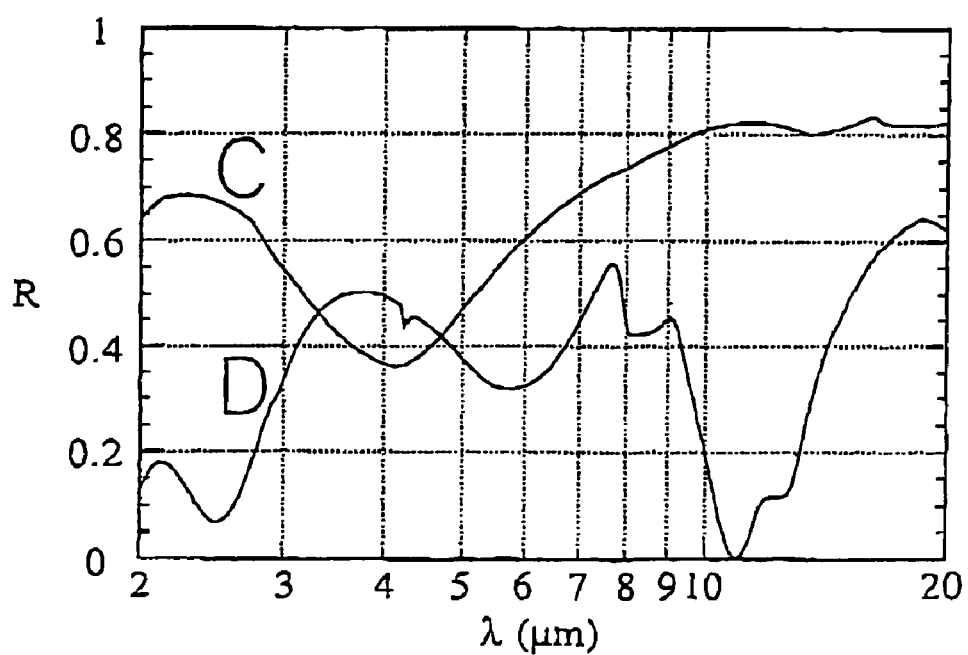

FIGS. 3 and 4 show diagrams of the spectral properties of the different coatings for the IR range without antireflex coating. In the diagrams, λ designates wavelength and R reflectance. Reflectance has been used instead of emittance which is here more relevant, since reflectance is easier to measure. Knowing the reflectance, however, emittance is easy to calculate. Curve A in FIG. 3 shows the reflectance of a visual plane with only the radar-reflecting coating. Curve B in the same Figure shows the reflectance of a ready-coated visual pane according to the preferred embodiment, i.e. also provided with the two coatings to increase emittance. The curve shows that the average reflectance is about 0.2 in the IR window 3-5 μm compared with about 0.75 for the merely radar-reflecting coating. Corresponding reflectances of the IR window 7-14 μm are 0.2 and 0.85, respectively. A reflectance of 0.2 corresponds to an emittance of 0.8 in this application, which is desired as stated above.

Curve C in FIG. 4 shows the reflectance of only the first coating of near stoichiometric tin oxide for the lower IR window 3-5 μm, together with the radar-reflecting coating. The curve shows a reflectance minimum at 4 μm in the centre of this range.

In the same Figure, curve D shows the reflectance of only the second coating of oxidised silicon nitride intended for the upper IR window 7-14 μm, together with the radar-reflecting coating. The curve shows a minimum at 11 μm which is within the range. It may be read that although no part of the curves reaches further down than to about 0.4 at the wavelength 4 μm, curve B for the completed layer reaches all the way down to an average value of about 0.2 in the range 3-5 μm. The combination of these two coatings is thus much more efficient than each coating by itself. The combined effect may be due to interference. The tendency is the same also for the IR window 7-14 μm.

When testing the reflectance of the pane for radar radiation after application of the two coatings, a reduction of less than 1% was measured. Since the reduction is negligible in the context, more exact measurements were not performed.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A pane for a combat vehicle or vessel which is transparent to radiation used for a purpose of its own, comprising a first layer on an outer face of said pane with which the pane is adapted to reflect a major part of a first electromagnetic radiation emitted by an enemy, and to reduce the pane's emittance of a second electromagnetic radiation received by the enemy, and a second layer arranged on the first layer, said second layer absorbing said second radiation so as to increase the pane's emittance of the second radiation, a thickness of said second layer being chosen to increase said emittance of the second electromagnetic radiation to such an extent that a difference in intensity between the second electromagnetic radiation received by the enemy from the pane and the intensity received by said enemy from the parts of the combat vessel which adjoin the pane, is so small that the pane essentially cannot be distinguished in an image of the combat vessel generated from said second electromagnetic radiation, said second layer at the same time essentially maintaining the pane's capability of reflecting the first radiation.

2. The pane as claimed in claim 1, wherein the first layer includes an electrically conductive material and is arranged to reflect radar beams, said second layer including at least one predetermined material and being arranged to increase, by means of the kind of said material, the emittance of the pane within at least part of the IR light range 2-20 μm.

3. The pane as claimed in claim 2, wherein the predetermined material is a first material capable of increasing the emittance of the pane in the IR light range 3-5 μm, said first material being included in a first coating which is arranged directly or by the intermediary of some other coating on the first layer.

4. The pane as claimed in claim 3, wherein the first material is near stoichiometric.

5. The pane as claimed in claim 3, wherein the first material includes a metal oxide with relatively low electrical resistance selected from the group consisting of titanium oxide, zirconium oxide, hafnium oxide, magnesium oxide and tin oxide.

6. The pane as claimed in claim 5, wherein the tin oxide is a tin dioxide (SnO$_2$).

7. The pane as claimed in claim 3, wherein the first coating has a thickness of 0.3-0.8 μm.

8. The pane as claimed in claim 2, wherein the predetermined material is a second material capable of increasing the emittance of the pane in the IR light range 7-14 μm, said second material being included in a second coating which is arranged directly or by the intermediary of some other coating on the first layer.

9. The pane as claimed in claim 8, wherein the second material is of a type that has residual beam properties.

10. The pane as claimed in claim 8, wherein the second material includes a ceramic selected from the group consisting of silicon oxide, quartz, beryllium oxide, beryllium silicate, silicon carbide, sialon, cubic boron nitride and silicon nitride.

11. The pane as claimed in claim 10, wherein the silicon nitride is an oxidised silicon nitride (SiO$_x$N$_y$).

12. The pane as claimed in claim 8, wherein the second coating has a thickness of 0.5-1.5 μm.

13. The pane as claimed in claim 1, wherein the pane is antireflex coated.

14. The pane as claimed in claim 13, wherein the pane includes a first antireflex coating arranged on the second layer and a second antireflex coating arranged on the inner face of the pane.

15. The pane as claimed in claim 14, wherein the first and second antireflex coatings consist of magnesium fluoride (MgF).

16. The pane as claimed in claim 13, wherein the pane includes an antireflex coating having four partial layers of alternately titanium dioxide (TiO$_2$) and magnesium fluoride (MgF), arranged on the second layer.

17. A pane for a combat vehicle or vessel which is transparent to visible light, comprising:
- a first layer with which the pane is adapted to reflect a major part of a first electromagnetic radiation emitted by an enemy, and to reduce the pane's emittance of a second electromagnetic radiation received by the enemy; and
- a second layer made of a material that absorbs said second radiation so as to increase the pane's emittance of the second radiation and with a thickness of said material such that said emittance of the second electromagnetic radiation is increased to a degree that an intensity of second electromagnetic radiation received by the enemy from the pane is substantially equal to an intensity of second electromagnetic radiation received by said enemy from parts of the combat vessel which adjoin the pane so that the pane is essentially indistinguishable from said adjoining parts in an image of the combat vessel generated from said second electromagnetic radiation, said second layer at the same time essentially maintaining the pane's capability of reflecting the first radiation.

18. The pane as claimed in claim 17, wherein the first layer includes an electrically conductive material and is arranged to reflect radar beams, said second layer including at least one predetermined material and being arranged to increase, by means of the kind of said material, the emittance of the pane within at least part of the IR light range 2-20 μm.

19. The pane as claimed in claim 18, wherein the predetermined material is a first material capable of increasing the emittance of the pane in the IR light range 3-5 μm, said first material being included in a first coating which is arranged directly or by the intermediary of some other coating on the first layer.

20. The pane as claimed in claim 19, wherein the first coating has a thickness of 0.3-0.8 μm.

* * * * *